United States Patent [19]

Downes

[11] Patent Number: 5,013,199

[45] Date of Patent: May 7, 1991

[54] STRIPLINE LAUNCHER SPRING WASHER

[75] Inventor: Carville M. Downes, Pasadena, Md.

[73] Assignee: Allied-Signal Inc., Morris Township, Morris County, N.J.

[21] Appl. No.: 451,846

[22] Filed: Dec. 18, 1989

[51] Int. Cl.$^5$ .................. F16B 43/02; H01R 11/22
[52] U.S. Cl. .................. 411/544; 411/368; 411/916; 267/161; 439/851
[58] Field of Search .............. 411/160–165, 411/544, 368; 267/161, 162; 439/433, 434, 851

[56] References Cited

U.S. PATENT DOCUMENTS

| | | | |
|---|---|---|---|
| 1,592,525 | 7/1926 | Hosking | 411/165 |
| 2,297,957 | 10/1942 | Hanneman | 411/164 |
| 2,675,844 | 4/1954 | Knohl | 411/164 |
| 3,170,736 | 2/1965 | Wright | 308/26 |
| 3,174,173 | 3/1965 | Cala | 248/204 |
| 3,259,383 | 7/1966 | Johnson et al. | 267/161 |
| 3,269,696 | 8/1966 | Norton | 267/161 |
| 3,483,888 | 12/1969 | Wurzel | 267/161 |
| 3,504,902 | 4/1970 | Irwin | 267/1 |
| 3,992,974 | 11/1976 | Miki et al. | 411/544 |
| 4,135,283 | 1/1979 | Kohlhage | 267/161 |
| 4,262,265 | 4/1981 | Nygren et al. | 333/33 |
| 4,383,226 | 5/1983 | Nygren et al. | 333/33 |
| 4,715,821 | 12/1987 | Axell | 439/59 |

Primary Examiner—Neill R. Wilson
Attorney, Agent, or Firm—Donald B. Paschburg; Howard G. Massung

[57] ABSTRACT

A stripline launcher spring washer exerts a constant force between a circuit board and stripline launcher hardware keeping the launcher and all of its hardware tight as the circuit board expands and contracts due to temperature variations. The stripline launcher spring washer has a plurality of slotted screw holes with each slotted screw hole capable of housing an individual screw. Upon expansion of the launcher hardware assembly, the washer provides a clamping force either outside or inside of the plurality of slotted screw holes depending on the washer's embodiment.

17 Claims, 3 Drawing Sheets

STRIPLINE LAUNCHER SPRING WASHER

BACKGROUND OF THE INVENTION

1. Field of the Invention

The present invention relates to a "Belleville" spherical or conical type of washer for use with a plurality of individual fasteners, such as screws or bolts, and more particularly to a single, one piece, "Belleville" type of washer that is used in a stripline launcher assembly.

2. Description of the Prior Art

Microwave circuit board materials based on polytetrafluoroethylene (PTFE) exhibit a Z-axis thermal expansion which is considerably greater than any expansion of the metal hardware used to clamp boards together or to attach surface launchers. The clamping screws' torque values may be specified to maintain a certain clamp force throughout the worst expected thermal excursion while still not exceeding the elastic limit or the plastic yield point of the hardware or board material. This may be adequate when the service temperature varies slightly, however, for more severe thermal variations the stresses or creep characteristics of PTFE based materials must be considered because the loosening of the hardware can hinder performance.

As temperature variations occur, loosening of the board assembly will occur because of the following. At a high temperature, creep rate is maximized due to both the increased stress caused by the mismatch of thermal expansion coefficients, and the increased temperature. At lower temperatures the initial clamp force will decrease to zero and the board assembly will loosen. Every temperature cycle will cause more creep and more loosening. The actual amount of deformation of the board for a single temperature cycle may be very small and it may take several temperature cycles, however, loosening will eventually occur.

A procedure to avoid creep problems on board assemblies is provided in a bulletin published by Rogers Corporation entitled "How To Avoid Creep Problems On Board Assemblies". This bulletin was discussed in an application note "Avoiding PC 'creep' problems", found in *MICROWAVES & RF.* March 1988, page 202. The solution proposed by Rogers Corporation is to lower the hardware stiffness and increase the range of elastic response. This will maintain tightness in spite of creep, and minimize stress increase at high temperatures. As discussed in the bulletin, a simple way to implement this method is to provide longer screws fitted with springs, such as a stack of "Belleville" washers. The washers are doubled up on each bolt and a spacer is used on every other bolt.

The disadvantages of the Belleville washer method as compared to the stripline launcher spring (SLS) washer of the present invention are as follows.

A. The Belleville washer method is limited to a temperature range which accommodates for a 0.004 inch change due to thermal expansion. The actual usable temperature range will depend on the coefficient of thermal expansion of the PTFE being used. A typical stripline launcher spring (SLS) washer can accommodate up to a 0.022 inch change due to thermal expansion.

B. The Belleville washer method applies a total clamping force which varies with temperature by 300 percent over its usable range (18 lbs. cold to 53 lbs. hot). The SLS washer of the present invention applies a total clamping force of approximately 250 lbs. (has been found to be appropriate) which varies with temperature by only 5 percent over its usable range. (Note: the usable range of the SLS washer of 0.022 inch is based on maintaining a force within 5 percent).

C. The Belleville washer method requires 17 parts for a typical launcher assembly that utilizes seven of the eight bolts, neglecting the launcher, bolts and back-up plate. The SLS washer requires only 1 part for the same assembly.

D. The Belleville washer method adds between 0.050 inch to 0.060 inch of additional height. The SLS washer adds between 0.020 inch to 0.030 inch of additional height. Applications that have space limitations can usually not afford the additional space requirements of the Belleville washer method.

SUMMARY OF THE INVENTION

The present invention overcomes the deficiencies of the prior art by providing a single, one piece, stripline launcher spring (SLS) washer which can be used to compensate for a mismatch in thermal expansion coefficients between circuit boards and coax-to-stripline launcher hardware. The SLS washer exerts an almost constant force on the launcher hardware keeping the launcher and all of its hardware tight as the circuit board expands and contracts due to temperature variations. The SLS washer can be used in any application where it is essential that assemblies be clamped together at a constant force. The SLS washer also uses less space, minimizes contact resistance, minimizes parts required and eliminates electromagnetic leakage caused by loose hardware.

The stripline launcher spring washer follows the concept of a "Belleville" washer or a spherical washer with a slotted screw circle as opposed to a single screw hole. More specifically, a typical washer has a typical hole which is capable of housing one screw. An SLS washer however has a hole which comprises a plurality of slots with each slot capable of housing an individual screw. Depending on various embodiments of the stripline launcher spring washer, these slots can be placed either along the inside rim of the washer, the outside rim of the washer or between the inside rim and the outside rim of the washer.

DETAILED DESCRIPTION OF THE DRAWINGS

The stripline launcher spring (SLS) washer is designed to compensate for a mismatch in thermal expansion coefficients between a circuit board and coax-to-stripline launcher hardware. The materials that can be used for the SLS washer are materials that can be hardened to a spring hardness such as beryllium copper, phosphor bronze, spring steel, stainless steel or any similar materials. The circuit board may be made out of several various types of material. Throughout this disclosure, we will assume that the circuit board is made out of polytetrafluorethylene (PTFE).

Figure 1:
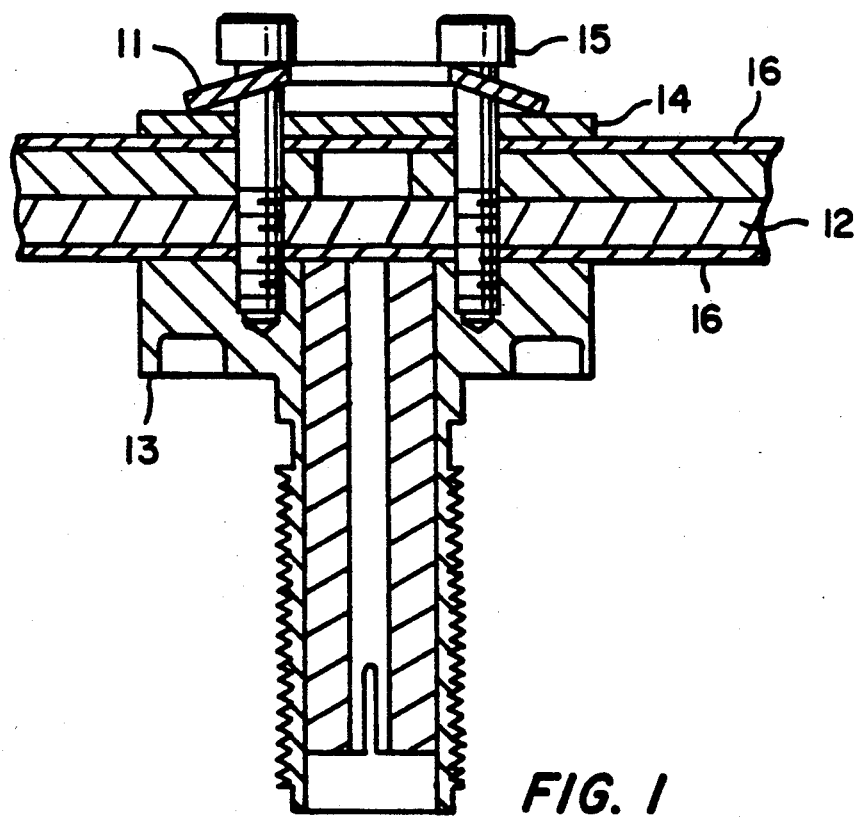
FIG. 1 illustrates a general side view cross section of one embodiment of the present invention as utilized in a typical launcher assembly (not compressed).

As illustrated in FIG. 1, typical launcher hardware sandwiches a PTFE stripline board 12 having a one ounce copper ground plane 16, with a coax launcher connector 13 on one side, a back-up plate 14 on the other side and, in this embodiment, six or seven screws (two shown) 15 holding the hardware together. The ground plane is copper cladding typically 0.0015 to 0.003 inch thick which is bonded to the PTFE material of the PTFE board 12. The back-up plate 14 is in direct contact with the ground plane 16 on one side of the PTFE board 12 and the launcher connector 13 is in direct contact with the ground plane 16 on the other side of the PTFE board 12. In this application, low resistance electrical contact is required to provide a continuous ground plane for electromagnetic shielding especially for high frequencies. Without proper shielding, RF leakage would occur which would effect the performance of the RF device.

FIG. 1 shows a section thru a typical launcher assembly which is utilizing the SLS washer 11 prior to compression of the SLS washer 11. If the screws 15 were tightened, the SLS washer 11 would flatten out and would look similar to the back-up plate 14 with a hole in the center. When the SLS washer 11 is in this flat position it provides a clamping force to the assembly.

The thermal expansion coefficient of PTFE and other types of board material is far greater (orders of magnitude) than typical metal hardware. As the assembly is heated, very high stresses are developed in both the PTFE board 12 and the screws 15, however, the PTFE material will expand at a far greater rate than the screws 15 and the PTFE material will creep out of its sandwich between the launcher connector 13 and the back-up plate 14. As the assembly cools off, the PTFE material will not return to its original thickness and the SLS washer 11 will become slightly unflattened. The SLS washer 11, however, will continue to provide the clamping force necessary to keep the assembly tight, thus providing the electrical contact needed for proper shielding.

Without the SLS washer 11 the combination of PTFE creep and stretching would cause a loosening of the launcher connector 13 and the screws 15 which would increase contact resistance, reduce effective shielding and cause RF leakage. By utilizing the SLS washer 11, RF leakage over large temperature excursions will effectively be eliminated due to the SLS washer's ability to provide an almost constant force between the screws 15 and the back-up plate 14, the back-up plate 14 and the ground plane 16, and the launcher connector 13 and the ground plane 16.

Figure 2:
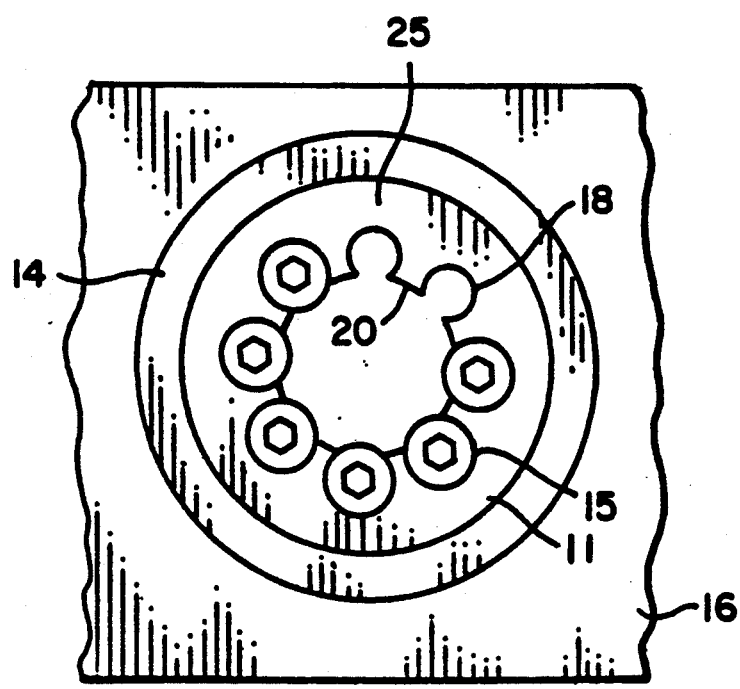
FIG. 2 illustrates a general top view of one embodiment of the present invention as utilized in a typical launcher assembly.

FIG. 2 illustrates a top view of one embodiment of the SLS washer 11 as utilized in the typical launcher assembly. In this embodiment, a plurality of slotted screw holes 18 lie along the inside rim 20 of the SLS washer 11. When utilizing this embodiment of the SLS washer 11, the back-up plate 14 must be at least as large as the SLS washer 11. This is because the SLS washer 11 is applying its clamping force at its outer portion 25 (outside of the slotted screw holes 18). If space is a problem, another embodiment of the SLS washer 11 as discussed in the following text, will allow for the back-up plate 14 to be smaller than the SLS washer 11. Also illustrated in FIG. 2 are screws 15 and the ground plane 16 which is in contact with the back-up plate 14.

Figure 3:
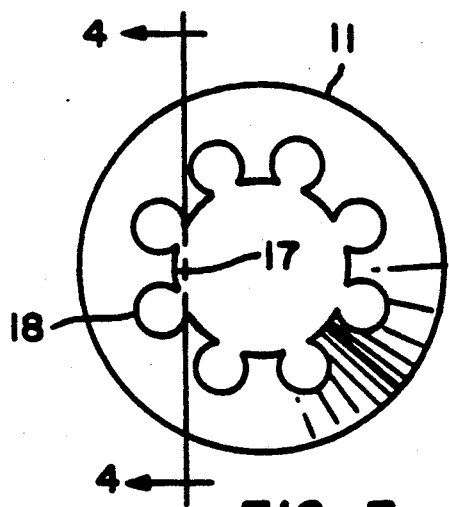
FIG. 3 illustrates a top view of one embodiment of the present invention.
Figure 4:
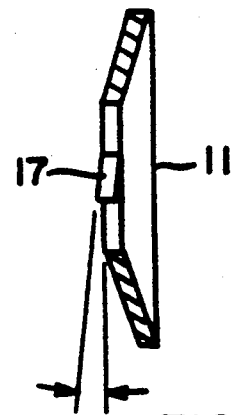
FIG. 4 illustrates a cross section view of one embodiment of the present invention.

The theory of operation of the SLS washer is complicated since in a typical embodiment it works on a set of six or seven screws in an eight-hole screw pattern. As illustrated in FIGS. 3 and 4, the SLS washer 11 in a preferred embodiment also works on each screw individually by utilizing small spring fingers 17. The spring fingers 17 are created by the slight twisting of the material left between the slotted screw holes 18. For best results, this material is twisted upward at approximately 8 degrees. The SLS washer works sufficiently without the spring fingers 17, however, the spring fingers 17 can provide extra movement that may be needed if one screw is slightly weaker than the others. The basic concept of the SLS washer is different from the "Belleville" washer or a spherical washer because of the slotted screw circle as opposed to a single screw hole. As discussed above and from FIGS. 1 and 2, the SLS washer 11 is compressed against the back-up plate 14 which distributes the load against the PTFE stripline board 12 and maintains contact between the SLS washer 11 and the back-up plate 14 to the ground plane 16. The counteracting force maintains contact between the coax launcher connector 13 and the ground plane 16. The small spring fingers 17 (FIGS. 3 and 4) provide spring retention and thus electrical contact between the SLS washer 11 and each screw 15 individually. In short, the SLS washer 11 allows the launcher hardware to expand and contract with the PTFE stripline board 12 over a large temperature range while maintaining low resistance electrical contact and providing effective electromagnetic shielding.

Figure 5:
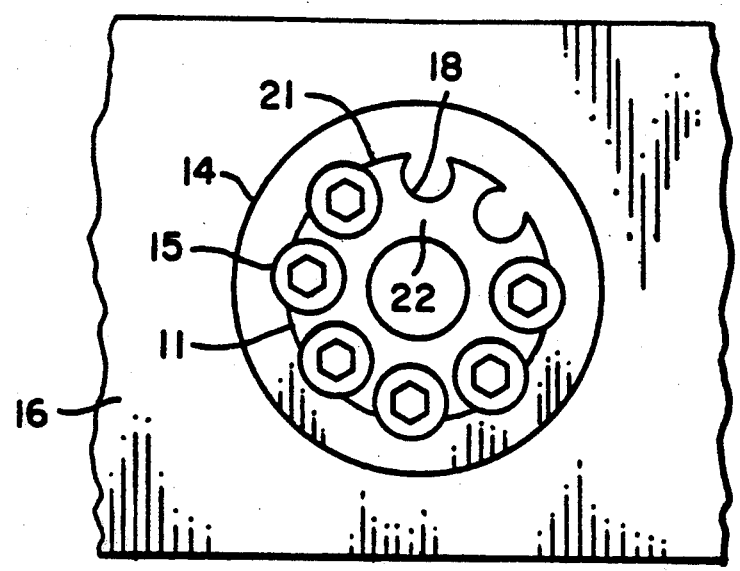
FIG. 5 illustrates a general top view of a second embodiment of the invention as utilized in a typical launcher assembly.
Figure 6:
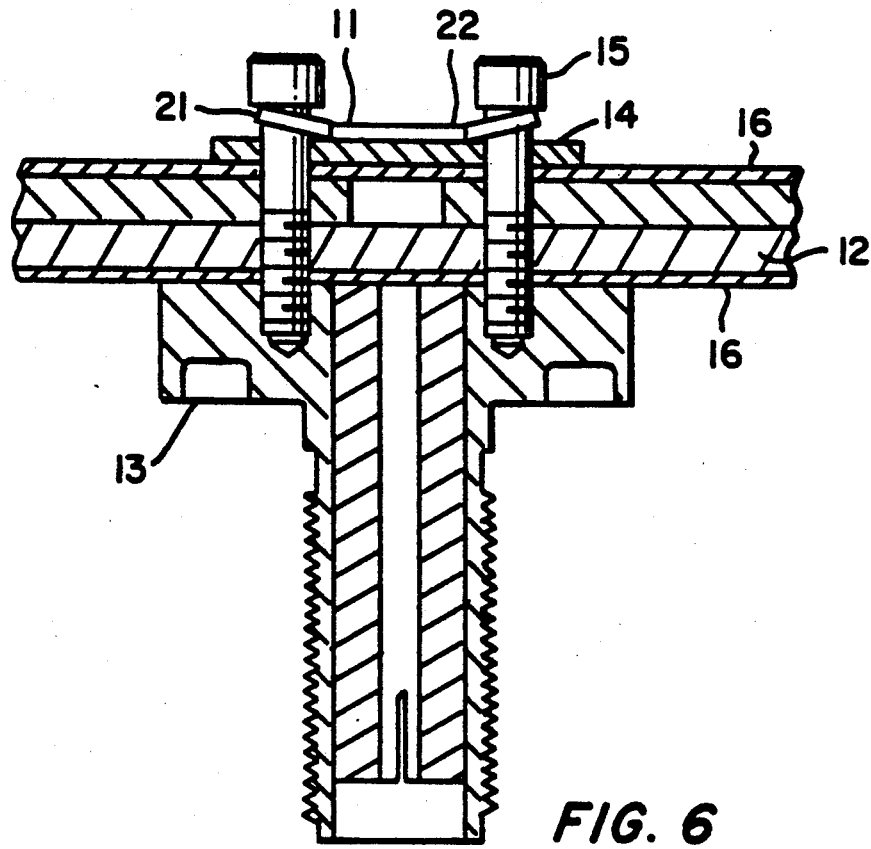
FIG. 6 illustrates a general side view cross section of the second embodiment of the invention as utilized in a typical launcher assembly (not compressed).

FIGS. 5 and 6 illustrate a second embodiment of the invention as utilized in a typical launcher assembly. The only difference between this second embodiment and the first embodiment of the SLS washer discussed above is that with this second embodiment the slotted screw holes 18 lie along the outside rim 21 of the SLS washer 11 and therefore the SLS washer 11 applies its clamping force inside of the slotted screw holes 18. With the first embodiment, the SLS washer (11 of FIG. 2) applied its clamping force outside of the slotted screw holes (18 of FIG. 2). As thermal expansion takes place, the screws 15 force the inner portion 22 of the SLS washer 11 to work against the back-up plate 14 which contacts the ground plane 16. With this embodiment, the back-up plate 14 can be smaller than the SLS washer 11 because only the inner portion 22 of the SLS washer 11 is working against the back-up plate 14. This is a very important feature when space limitations exist.

FIG. 6 illustrates a section thru a typical launcher assembly which is utilizing the second embodiment of the SLS washer 11 prior to compression of the SLS washer 11. As can be seen, the screws 15 lie along the outside rim 21 of the SLS washer 11 and the inner portion 22 of the SLS washer 11 contacts the back-up plate 14 which contacts the ground plane 16. Also illustrated in FIG. 6 and discussed earlier are the PTFE stripline board 12 and the launcher connector 13.

Figure 7:
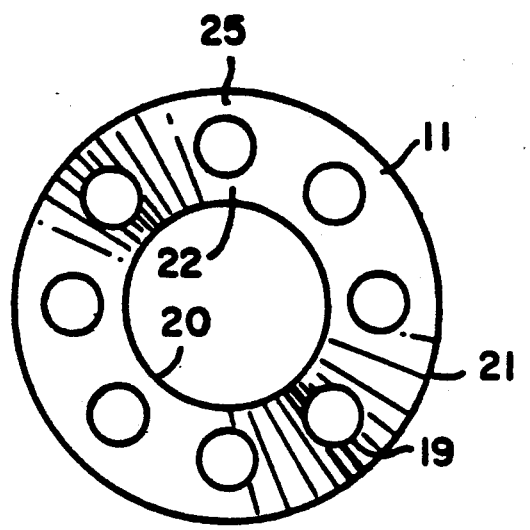
FIG. 7 illustrates a top view of a third embodiment of the invention.
Figure 8:
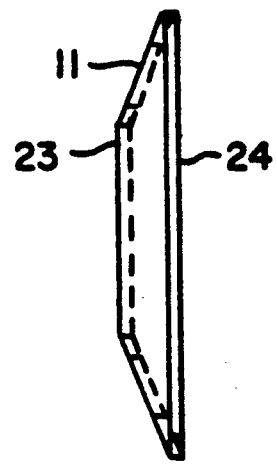
FIG. 8 illustrates a side view of the third embodiment of the invention.

FIGS. 7 and 8 illustrate a third embodiment of the SLS washer 11. In this third embodiment, the slotted screw holes (18 of FIG. 2) are replaced by a plurality of spaced apart small circles 19 located between the inside rim 20 and the outside rim 21 of the SLS washer 11. In this embodiment, the SLS washer 11 can apply its clamping force either at its inner portion 22 (inside of the circles 19) or at its outer portion 25 (outside of the circles 19) depending on whether the assembler of the launcher hardware places the topside 23 or the bottomside 24 respectively of the SLS washer 11 against the back-up plate.

Depending on the application where it is used, there are several other various embodiments of the SLS washer. In general, the SLS washer must exert an appropriate force such that the stresses in the screws do not exceed the screw material's proportional limit and the pressure that is exerted on the circuit board must be limited to prevent creep from occurring. The factors that must be considered in the design of the SLS washer are; the diameter of the screws, the material of the screws, the number of screws, the diameter of the back-up plate, the type of board material (reinforced PTFE random or woven fibers, fiberglass, composites, etc.), the thermal expansion mismatch, the operating temperature range, and any space limitations. The SLS washer must be designed from the above information by controlling; the material, the temper, the inside diameter or outside diameter depending on whether the washer works inside or outside the bolt circle, the thickness, and the overall height.

As an example, a specific application for one embodiment of the SLS washer utilizes six 0-80 stainless steel screws on a 0.300 inch diameter bolt circle, a 0.625 inch diameter back-up plate, Rogers Corporation 5880 PTFE board material having a thickness of 0.120 inch with an operating range of $-60°$ F. to $+160°$ F., and a space limitation of 0.150 inch. The head of a 0-80 screw is 0.060 inch high and the back-up plate needs to be at least 0.030 inch to distribute the load properly. The total thickness of the assembly leaves 0.060 inch for the SLS washer not including any tolerance. With reasonable tolerances, the space limitation is 0.045 inch. The mismatch in thermal expansion, the temperature range and the board type and thickness give a total of 0.004 inch variation that must be accommodated for by the SLS washer. This embodiment of the SLS washer will exert 250 lbs. ±5 percent between flat and 0.022 inch from flat. This application only requires 0.004 inch of movement but it could handle much more. At 250 lbs., each screw sees 41.7 lbs. or 15,000 PSI normal stress which is well below stainless steel proportional limit. The pressure on the PTFE stripline board will be 815 PSI which is sufficient to maintain low resistance electrical contact and effective shielding but will not cause PTFE creep.

It is not intended that this invention be limited to the application or arrangement shown disclosed. Various variations of the one piece SLS washer can be used extensively throughout the electronics industry wherever bolts, connectors, launchers, or components of any kind are utilized to sandwich materials having different thermal expansion coefficients while maintaining a secure fit or a low resistance electrical contact. This invention includes all of the alterations and variations thereto as encompassed within the scope of the claims as follows.

What I claim:

1. A stripline launcher spring washer comprising:
   a dish-like member having a topside, a bottomside, an inside rim and an outside rim;
   a hole through said dish-like member contacting said inside rim;
   a plurality of slotted screw holes contacting said hole and placed along said inside rim of said dish-like member with each of said plurality of slotted screw holes capable of housing an individual screw; and,
   clamping force means effected by tightening the individual screws in their respective screw holes to compress the washer for providing a constant clamping force over various environmental conditions to hardware contacting said dish-like member.

2. A stripline launcher spring washer as claimed in claim 1 wherein:
   said clamping force means applies a clamping force outside of said plurality of slotted screw holes.

3. A stripline launcher spring washer as claimed in claim 1 wherein said clamping force means further comprises:
   a plurality of small spring fingers, said small spring fingers being formed by slight twists of material of said inside rim between said plurality of slotted screw holes.

4. A stripline launcher spring washer as claimed in claim 1 wherein said clamping force means further comprises:
   spring means to provide that said topside lies above said bottomside and during compression of said washer, said topside approaches said bottomside.

5. A stripline launcher spring washer as claimed in claim 1 wherein said clamping force means further comprises:
   spring means to provide said inside rim lies in a plane above a plane of said outside rim and during compression of said washer, the plane of said inside rim approaches the a plane of said outside rim.

6. A stripline launcher spring washer comprising:
   a dish-like member having a topside, a bottomside, an inside rim and an outside rim;
   a hole through said dish-like member contacting said inside rim;
   a plurality of slotted screw holes placed along said outside rim of said dish-like member with each of said plurality of slotted screw holes capable of housing an individual screw; and,
   clamping force means effected by tightening the individual screws in their respective screw holes to compress the washer for providing a constant clamping force over various environmental conditions to hardware contacting said dish-like member.

7. A stripline launcher spring washer as claimed in claim 6 wherein:
   said clamping force means applies a clamping force inside of said plurality of slotted screw holes.

8. A stripline launcher spring washer as claimed in claim 6 wherein said clamping force means further comprises:
   plurality of small spring fingers, said small spring fingers being forced by slight twists of material of said outside rim between said plurality of slotted screw holes.

9. A stripline launcher spring washer as claimed in claim 6 wherein said clamping force means further comprises:
spring means to provide that said topside lies above said bottomside and during compression of said washer, said topside approaches said bottomside.

10. A stripline launcher spring washer as claimed in claim 6 wherein said clamping force means further comprises:
spring means to provide that said inside rim lies in a plane below a plane of said outside rim and during compression of said washer, the plane of said inside rim approaches the plane of said outside rim.

11. A stripline launcher spring washer comprising:
a dish-like member having a topside, a bottomside, an inside rim and an outside rim;
a hole through said dish-like member contacting said inside rim;
a plurality of screw holes placed between said inside rim and said outside rim of said dish-like member with each of said plurality of screw holes capable of housing an individual screw; and,
clamping force means effected by tightening the individual screws in their respective screw holes to compress the washer for providing a constant clamping force over various environment conditions to hardware contacting said dish-like member.

12. A stripline launcher spring washer as claimed in claim 11 wherein:
said clamping force means applies a clamping force outside of said plurality of screw holes.

13. A stripline launcher spring washer as claimed in claim 11 wherein:
said clamping force means applies a clamping force inside of plurality of screw holes.

14. A stripline launcher spring washer as claimed in claim 11 wherein:
said clamping force means applies a clamping force either inside of said plurality of screw holes or outside of said plurality of screw holes.

15. A stripline launcher spring washer as claimed in claim 11 wherein said clamping force means further comprises:
spring means to provide that said topside lies above said bottomside and during compression of said washer, said topside approaches said bottomside.

16. A stripline launcher spring washer as claimed in claim 11 wherein said clamping force means further comprises:
spring means to provide that said inside rim lies in a plane above or below a plane of said outside rim and during compression of said washer, the plane of said inside rim approaches the plane of said outside rim.

17. An apparatus for providing improved electrical contact with stripline launcher hardware comprising:
a dish-like member having a topside, a bottomside, an inside rim and an outside rim;
a hole through said dish-like member contacting said inside rim;
a plurality of slotted screw holes contacting said hole and placed along said inside rim of said dish-like member with each of said plurality of slotted screw holes being capable of housing an individual screw; and,
clamping force means effected by tightening the individual screws in their respective screw holes to compress the washer for providing a constant clamping force over various environmental conditions to said stripline launcher hardware contacting said dish-like member.

* * * * *